United States Patent
Aoki et al.

(10) Patent No.: US 6,191,508 B1
(45) Date of Patent: Feb. 20, 2001

(54) STATOR INSULATION STRUCTURE OF ROTARY ELECTRIC MACHINE

(75) Inventors: Takashi Aoki, Toyoake; Shinichi Matsubara; Mitsuru Kato, both of Anjo; Kazuhide Sato, Ama-gun, all of (JP)

(73) Assignee: Denso Corporation, Kariya (JP)

( * ) Notice: Under 35 U.S.C. 154(b), the term of this patent shall be extended for 0 days.

(21) Appl. No.: 09/482,613

(22) Filed: Jan. 14, 2000

(30) Foreign Application Priority Data

Jan. 18, 1999 (JP) .................................................. 11-009043
Aug. 5, 1999 (JP) .................................................. 11-222389

(51) Int. Cl.[7] .............................. H02K 3/30; H02K 3/34
(52) U.S. Cl. ............................ 310/45; 310/179; 310/215
(58) Field of Search .................. 174/137 R; 310/43, 310/45, 179, 180, 215

(56) References Cited

U.S. PATENT DOCUMENTS 4,562,164 * 12/1985 Miyazaki et al. ...................... 310/45
5,097,167   3/1992 Kanayama et al. ................... 310/201

FOREIGN PATENT DOCUMENTS 62-272836  11/1987 (JP) ................................. H02K/3/04
63-274335  11/1988 (JP) ................................. H02K/3/04

* cited by examiner

Primary Examiner—Burton Mullins
(74) Attorney, Agent, or Firm—Pillsbury Madison & Sutro LLP

(57) ABSTRACT

In an insulation structure of a rotary electric machine, a stator winding has connection portions covered with reliable insulation resin coating. The modulus of elasticity of the insulation resin is less than a value which may not cause the insulation resin coating to peel off. The modulus of elasticity changes with the thickness of the insulation resin coating.

12 Claims, 6 Drawing Sheets

FIG.8

| | CONDUCTOR | INSULATION RESIN | REMARKS |
|---|---|---|---|
| CONVENTIONAL SAMPLE 1 | COPPER | FLEXIBLE EPOXY (URETHANE) (M OF E: 1MPa) | CARBONIZED (1A OR MORE) |
| CONVENTIONAL SAMPLE 2 | COPPER | SILICONE (M OF E: 10MPa OR LESS) | CRACKED (1A OR MORE) |
| CONVENTIONAL SAMPLE 3 | COPPER | EPOXY POWDER (M OF E: 10GPa) | PEELED, CRACKED (1A OR MORE) |
| EMBODIMENT 1 | COPPER | SILICONE $FeO, Fe_2O_3$ (M OF E: 10MPa OR LESS) | NORMAL (1mA OR LESS) |
| EMBODIMENT 2 | COPPER | SILICONE $FeO, Fe_2O_3, Al_2O_3$ (M OF E: 10MPa OR LESS) | NORMAL (1mA OR LESS) |
| EMBODIMENT 3 | COPPER | EPOXY POWDER $SiO_2$ (M OF E: 1GPa) | NORMAL (1mA OR LESS) |
| EMBODIMENT 4 | COPPER | EPOXY POWDER $SiO_2, Al_2O_3$ (M OF E: 1GPa) | NORMAL (1mA OR LESS) |

STATOR INSULATION STRUCTURE OF ROTARY ELECTRIC MACHINE

CROSS REFERENCE TO RELATED APPLICATION

The present application is based on and claims priority from Japanese Patent Applications Hei 11-9043 filed Jan. 18, 1999, and Hei 11-222389 filed Aug. 5, 1999, the contents of which are incorporated herein by reference.

BACKGROUND OF THE INVENTION

1. Field of the Invention

The present invention relates to a stator insulation structure of a rotary electric machine and, particularly, of a stator winding having connection portions covered by insulation-resin-coating.

2. Description of Related Art

It is known that a stator of a vehicle AC generator has a stator winding formed of a plurality of conductor segments which are welded to one another. For example, JP-A-62-272836 or JP-A-63-274335 discloses such an armature coil. Such an armature coil is formed of conductor segments, which are welded to one another at their ends in a wave-wound type. The coil ends are covered with and supported by resin coating.

Because muddy water may get into the inside of the AC generator when the vehicle is driven on a rough road, it is necessary that insulation resin coating is coated after conductor segments are welded to one another at their ends. However, the above disclosed armature coil only has only support coating that covers conductor members of coil ends. There is no detailed explanation about the insulation performance. Because the support coating needs a certain hardness, gaps may be formed between conductor members and the resin coating. Therefore, muddy water or other electrolyte may get into the inside of the generator to cause an insulation failure. Therefore, it is necessary to tightly cover connection portions.

SUMMARY OF THE INVENTION

The present invention has been made in view of the above problems and has an object to provide an insulation structure of a stator of rotary electric machine, which includes a vehicle AC generator.

In the insulation structure of a rotary electric machine according to the invention, the modulus of elasticity of the insulation resin coating is so small that the insulation resin coating will not peel off from the connection portions. It has been found that the allowable value of the modulus of elasticity changes according to the thickness of said insulation resin coating. A shearing force to peel off the insulation resin coating changes due to the material of the stator winding. The maximum allowable modulus of elasticity changes as thickness of the insulation resin coating changes. Accordingly, insulation resin coating having a modulus of elasticity that is less than the maximum allowable modulus of elasticity can prevent the insulation resin coating from peeling off. The insulated connection portions endure well.

In particular, it is preferable that the thickness of the insulation resin coating is 0.5 mm, and the stator winding is made of copper. In a vehicle AC generator, gaps between connection ends are mostly about 0.5 mm and the stator winding is made of copper. These limitations decide the shearing force of peeling off the insulation resin coating. Thus, the maximum allowable modulus of elasticity is decided according to the thickness of the insulation resin coating. Therefore, the insulation resin can be easily selected from various materials.

If silicone contains a certain amount of oxidant inhibitor, it becomes resistant to thermal shock cycles. Therefore, silicone can be used as the insulation resin coating.

If epoxy resin contains coefficient-of-expansion adjusting material, it can reduce the shearing force. Therefore, epoxy resin can be suitable as the insulation resin coating.

The percentage content of the oxidant inhibitor is preferably between 0.01% and 5.0%. On the other hand, the percentage content of the coefficient-of-expansion adjusting material is preferably between 0.01% and 70%.

The vehicle AC generator's stator according to a preferred embodiment of the invention includes a stator core having a plurality of slots and a stator winding having a plurality of conductor segments which are disposed in the plurality of slots and are connected with one another at ends thereof. The connection portions of the stator winding are covered with the above stated insulation resin coating. The vehicle AC generator is always exposed to muddy water or the like that may cause insulation failure. However, the above stated insulation resin coating covers the connection portions completely and would not peel off, so that the connection portions can be completely prevented from short-circuiting with other parts.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 8 is a table showing a thermal shock result with various insulation resin coatings.

DETAILED DESCRIPTION OF THE PREFERRED EMBODIMENTS

An insulation structure of a vehicle AC generator according to a preferred embodiment of the present invention is described below in detail with reference to the appended drawings.

Figure 1:
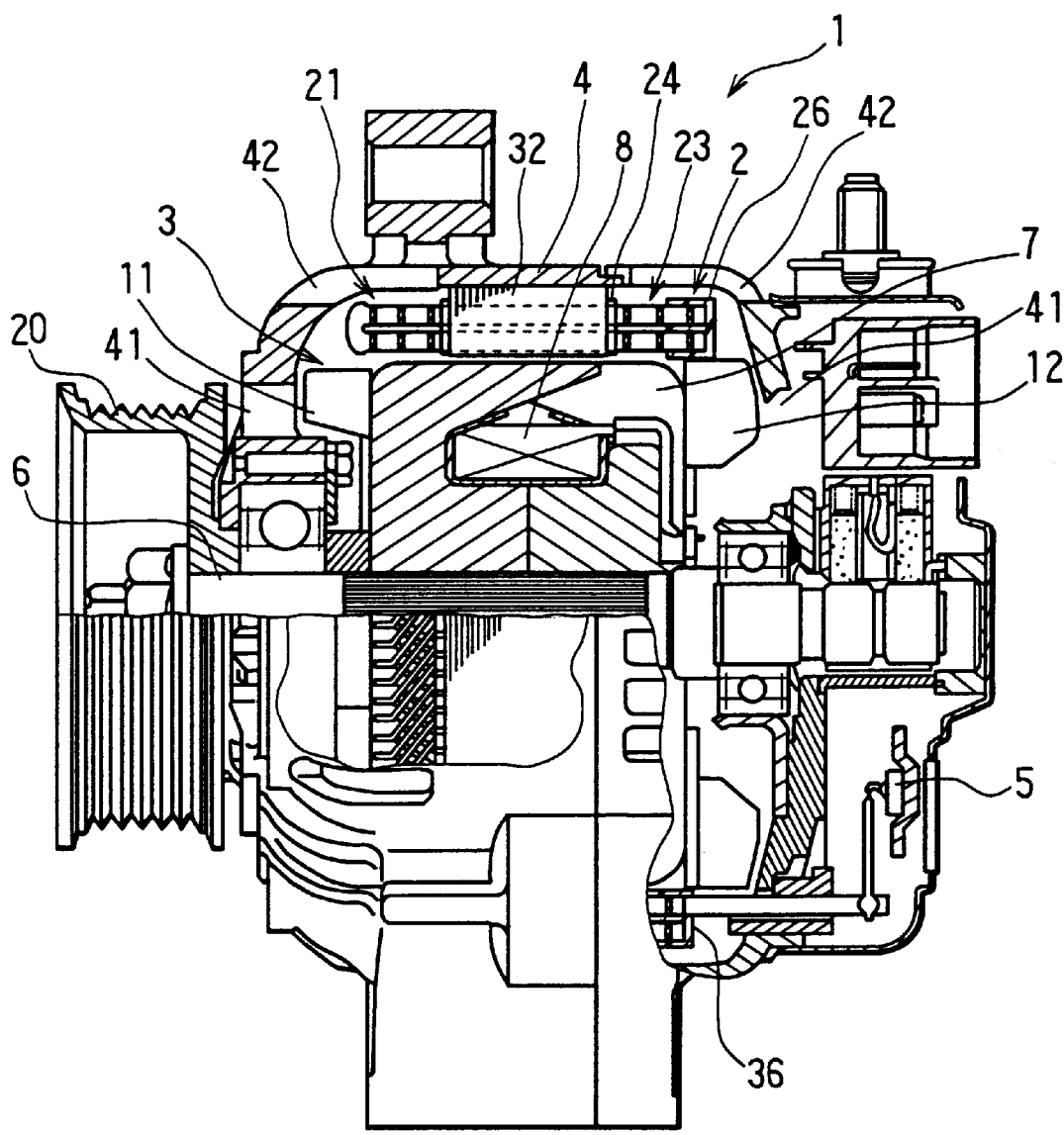
FIG. 1 illustrates an entire structure of a vehicle AC generator.

In FIG. 1, generator 1 includes stator 2, rotor 3, frame 4, rectifier 5 and other elements. Stator 2 will be described in more detail later.

Stator 2 includes stator core 22, a plurality of conductor segments 23, which form a stator winding, insulators disposed between stator core 22 and the plurality of conductor segments 23.

Rotor 3 includes field coil 8 which is formed of a cylindrically wound insulated copper wire and is fixed by a pair of pole cores 7 each having six claw poles between opposite ends thereof and by shaft 6. Mixed-flow cooling fan 11 is fixed by welding or the like to front pole core 7 to take in cooling air from the front end of the generator and discharge the same in the axial and radial directions. Centrifugal cooling fan 12 is fixed by welding or the like to rear pole core 7 to take in cooling air from the rear end of the generator and discharge the same in the radial directions.

Frame 4 accommodates and supports stator 2 and rotor 3 so that rotor 3 can rotate about shaft 6 and so that stator 2 can be positioned around rotor 3 at a certain gap therefrom. Frame 4 has air-discharge windows 42 formed opposite coil ends of the stator winding projecting axially outward from the axial ends of stator core 22 and air-intake windows 41 formed at the axial ends thereof.

When engine torque is transmitted to pulley 20 via belt and the like, rotor 3 rotates in a prescribed direction. Field coil 8 of rotor 3 is powered from outside, the claw poles of the pair of pole cores 7 are magnetized so that three-phase AC voltage can be generated in the stator winding. As a result, a prescribed amount of DC current can be taken out from the output terminal of rectifier 5.

Figure 2:
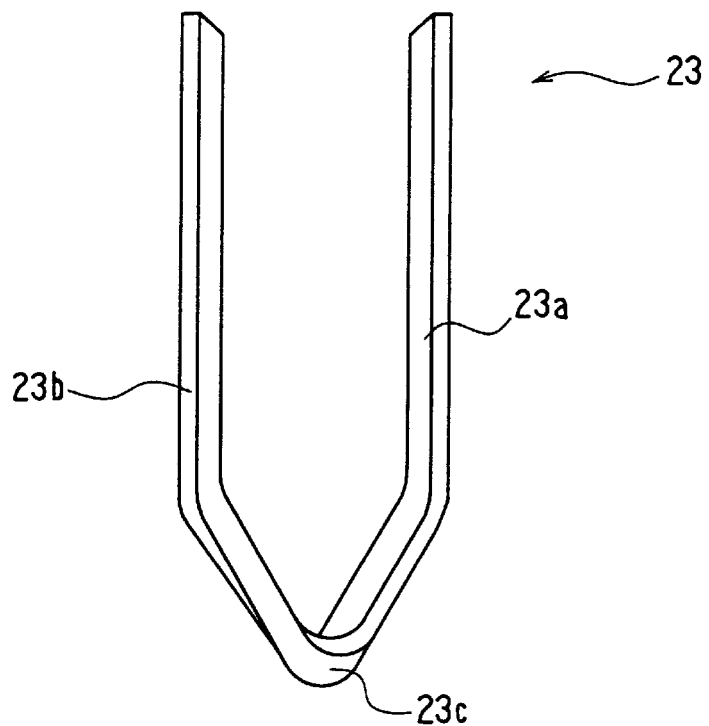
FIG. 2 is a perspective view of a conductor segment forming a stator winding.

As shown in FIG. 2, conductor segment 23 is formed from a metal (e.g. copper) rod or plate into a U-shaped member having turn portion 23c. Conductor segment 23 includes inner portion 23a to be disposed at a slot inner layer and outer portion 23b to be disposed at slot outer layer. Each of inner portion 23a and outer portion 23b has a straight in-slot portion to be disposed in the slot and an out-slot portion to form a coil end.

Figure 3:
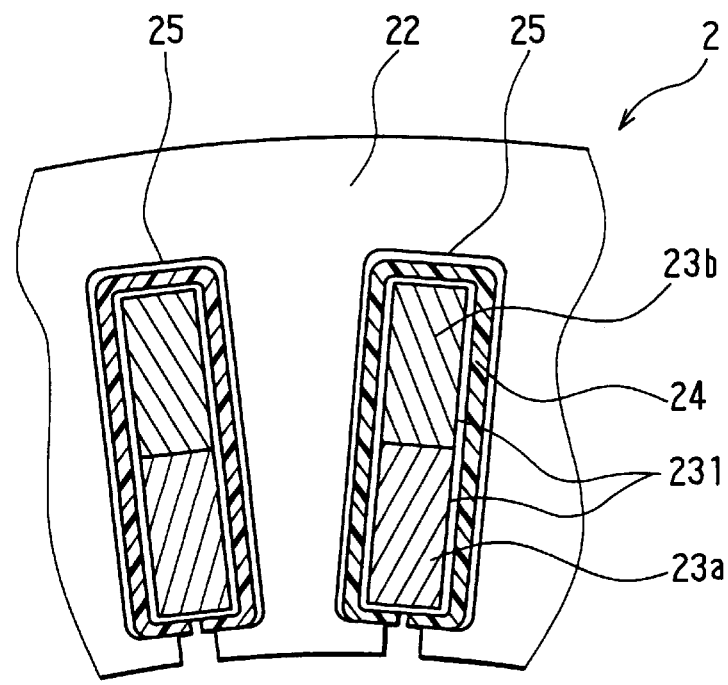
FIG. 3 is a fragmentary cross-sectional view of a stator.

The stator winding is formed of a pair of conductor segments disposed in each slot 25 of stator core 22. Conductor segments 23 disposed in different slots 25 are connected at their ends to one another. As shown in FIG. 3, the cross-section of each of the inner portion 23a and outer portion 23b is a rectangle having the radial sides longer than the circumferential sides. The longer radial sides are fitted into slot 25. Conductor segment 23 has insulation film 231 thereon to insulate adjacent conductor segments 23 from each other. Insulation film 231 is made of polyamide. Insulators 24 insulate respective conductor segments 23 from the inside wall of slots 25.

Figure 4:
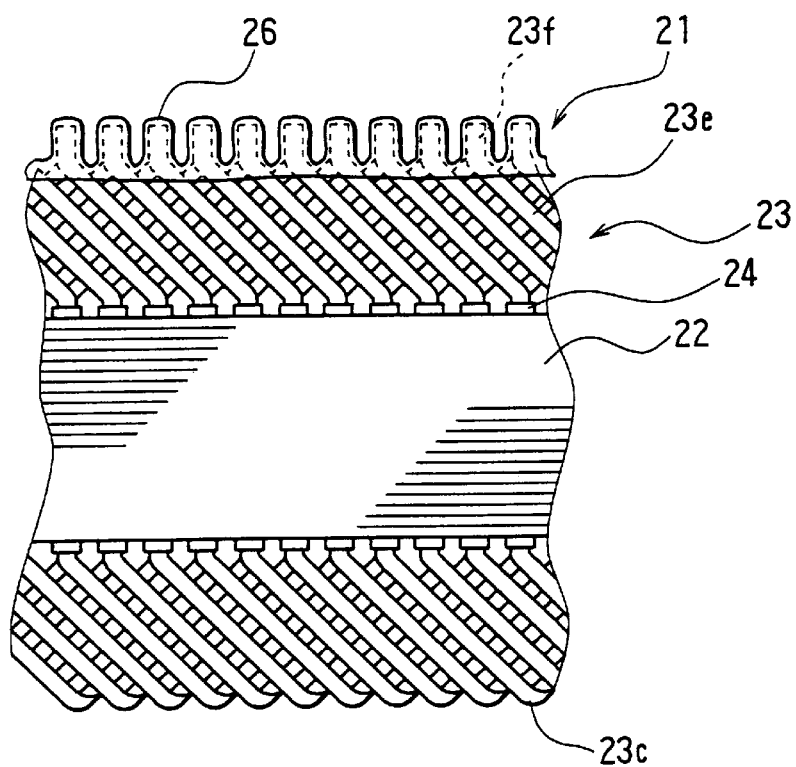
FIG. 4 is a fragmentary outside appearance of the stator.

As shown in FIG. 4, turn portion 23c of each of conductor segments 23 is disposed at one axial end of stator core 22, and edge portion 23f opposite to turn portion 23c is regularly disposed at the other end of stator core 22. Conductor segment 23 has inclined portion 23e which forms another coil end 21. Each of inclined portions 23e in the inner layer inclines in the same one direction, and each of inclined portions 23e in the outer layer inclines in the opposite direction to cross each other. Edge portions 23f are respectively formed at the opposite ends of conductor segment 23 and connected to one another by a TIG (tungsten inert-gas) welder.

Insulation resin coating 26 is formed at the portion between edge portion 23f and a part of inclined portion 23e. Only a part of inclined portion 23e of conductor segment 23 is coated with insulation resin coating 26, and most of inclined portion 23e is not coated with the same. Therefore, network-shaped cooling passages are formed by inclined portions 23e of conductor segments 23 to provide efficient cooling performance.

Figure 5:
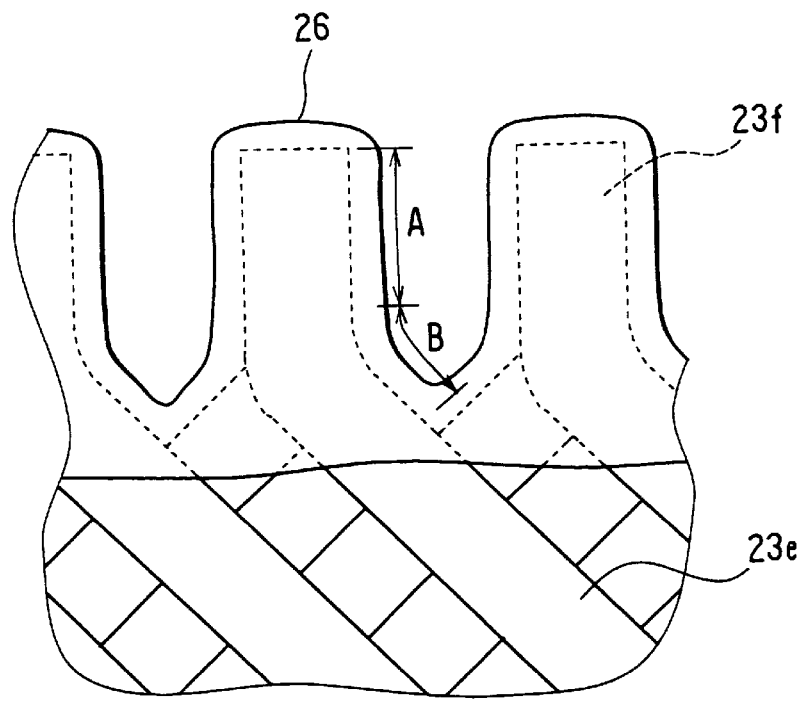
FIG. 5 illustrates a portion of the stator around connection portions of the conductor segments.

In the meantime, the welding causes deterioration of the connection portions and their vicinities. For example, the TIG welding oxidizes the surface of the welded portions of edge portions 23f and damages the insulation film of the vicinities thereof. As shown in FIG. 5, the surface of the welded connection portions (area A) may be considerably oxidized. The insulation film on the portions (area B) adjacent to the welded connection portions is also damaged or deteriorated due to the welding heat. If the surface is oxidized, damaged or deteriorated, insulation resin coating 26 can not stick very well. Because the adhesiveness of insulation resin coating 26 to the surface of conductor segment 23 corresponding to area A and area B or adhesiveness of deteriorated insulation film to conductor segment 23 is low, resin powder, which is heated to form insulation resin coating 26, is applied not only to area A and area B but also unhurt portions adjacent thereto so that insulation resin coating 26 can tightly adhere to conductor segment 26, as shown in FIG. 5.

If the surface of the connection portions of conductor segment 23 is oxidized and oxide film is formed thereon, insulation resin coating 26 has to be coated on the oxide film. However, the strength of the oxide film is much lower than that of copper conductor segment 23. If an excessive shearing force is applied between the oxide film and insulation resin coating 16 due to thermal shock caused while the AC generator operates, the oxide film may be broken, and insulation resin coating 26 may peel off or crack. The heat-deteriorated insulation film can not adhere to conductor segment 23 very tightly, and this may also peel off. Therefore, insulation resin coating 26 has to have a suitable modulus of elasticity and a suitable thickness that prevent an excessive shearing force, as described in detail later.

Figure 6:
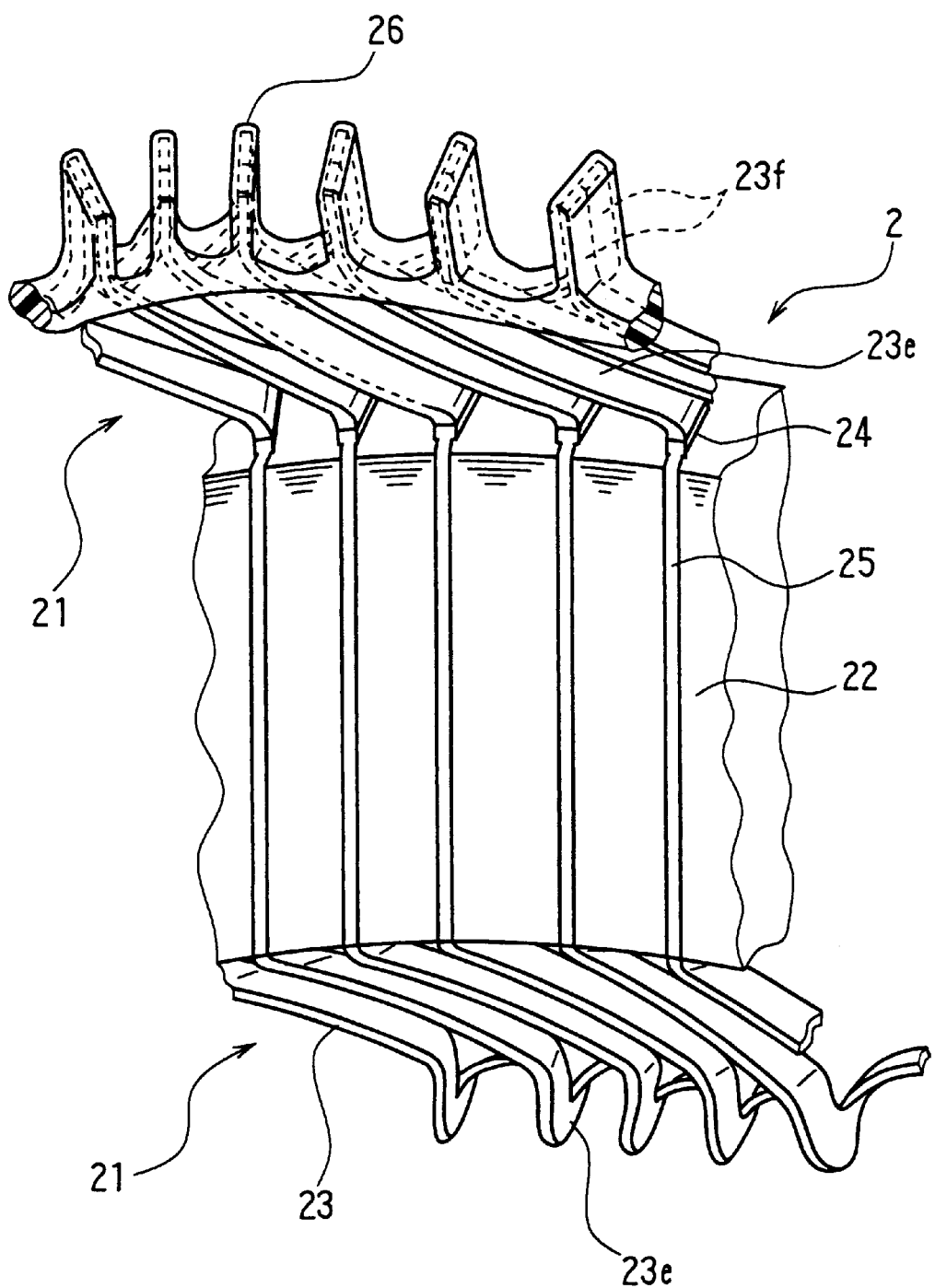
FIG. 6 illustrates details of coil ends at opposite ends of the stator.

A manufacturing process of the stator is described below. At first, insulator 24 is inserted into each of slots 25 of stator core 22. A plurality of U-shaped conductor segments 23 having outer portion 23b, inner portion 23a and turn portion 23c are piled up so that all turn portions 23c are positioned at one axial end of stator core 22, and so that the outer portions 23b and inner portions 23a are respectively disposed deep and shallow in slots 25. Each of conductor segments 23 is formed of a copper plate having insulation film thereon. The copper plate is bent and formed into a U-shape by a press machine or the like. Each of conductor segments 23 is inserted into one of slots 25 via insulator 23 so that opposite sides of outer portion 23b and inner portions 23a are press-fitted to approximately parallel the side wall of slot 25. Then, as shown in FIG. 6, edge portions 23f of outer and inner layers are bent so that edge portions 23f of conductor segments 23 disposed at one layer are bent in a circumferential direction opposite to edge portions 23f of conductor segments 23 disposed at the other layer. Then, edge portions 23f of conductor segments 23 in different layers are welded to one another. At this stage, insulation film of connection portion of conductor segments 23 is peeled off.

Subsequently, insulation resin coating 26 is coated on edge portions 23f of conductor segments 23 and a part of inclined portions 23e and, then, is hardened. As shown in FIG. 4, when insulation resin coating 26 is formed into a wave shape which outlines edge portion 23f and a part of inclined portion 23e, edge portion 23f is placed down side to dip in liquid insulation resin. A fluidized dipping method is suitable to this step.

According to a heat-shock-cycle test of stator core 2 and FEM (Finite Element Method), it has been found that peeling-off or cracking is caused mainly by the modulus of elasticity of insulation resin coating 26 and the shearing force acting between insulation resin coating 26 and oxide film around the connection portions.

Figure 7:
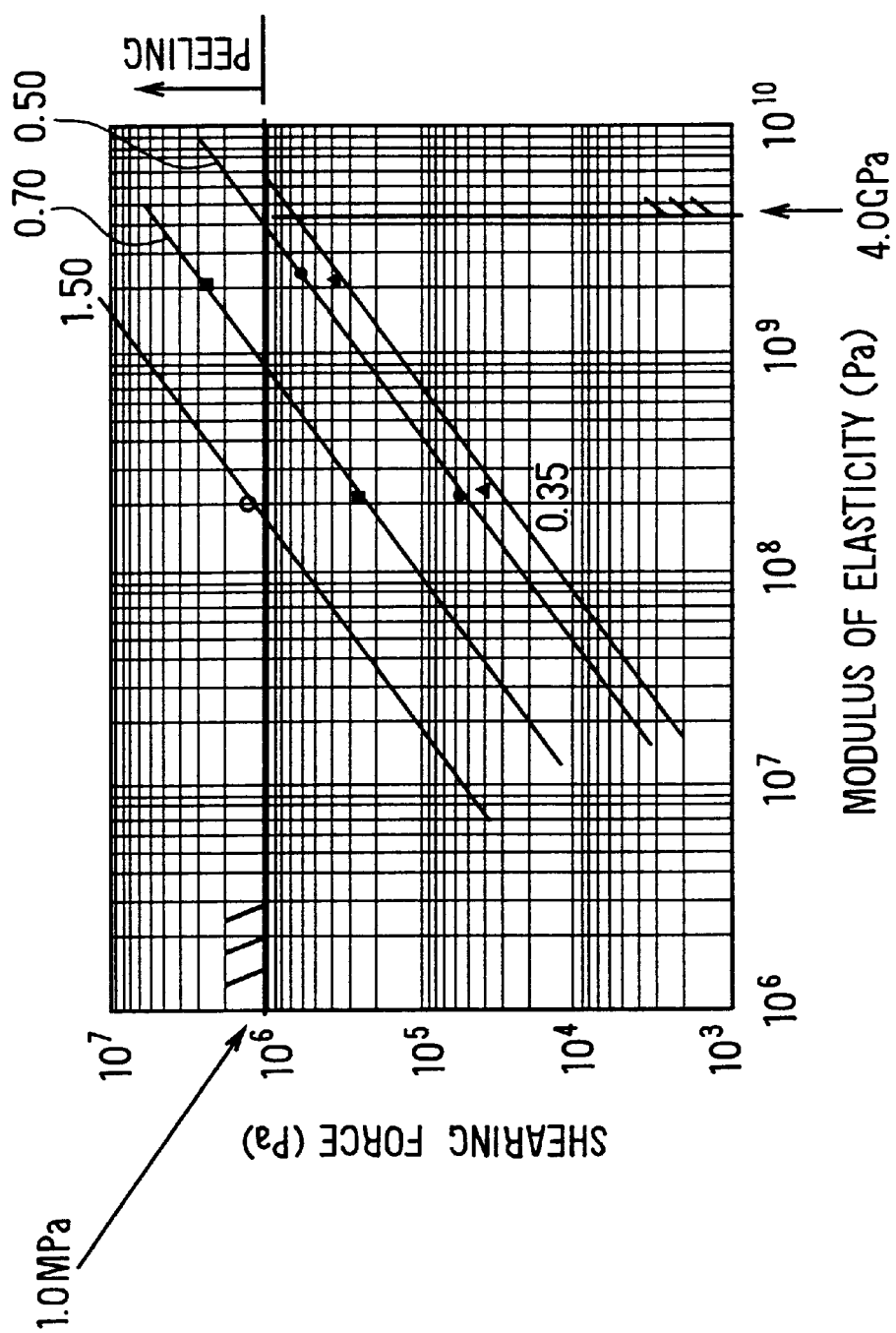
FIG. 7 is a graph showing a relationship between the modulus of elasticity of the insulation resin and the shearing force appearing at the oxide film on the connection portion of the copper conductor segment.

FIG. 7 is a graph showing the relationship between the modulus of elasticity of insulation resin coating 26 and the shearing force thereof on the oxide film of the connection portions. If the surface of copper conductor segment 23 is oxidized, the oxide film is broken before insulation resin coating 26 coated on conductor segment 23 peels off. Therefore, the peel-off of insulation resin coating can be prevented if the shearing force applied to the oxide film from insulation resin coating 26 is limited to be less than the strength of the oxide film. The strength of the oxide film is about 1.0 MPa, which does not vary with thickness of insulation resin coating 26.

Assuming that the thickness of insulation resin coating 26 is 0.5 mm, the result of analysis in FIG. 7 shows that the shearing force of insulation resin coating 26 on the oxide film becomes 1.0 MPa if the modulus of elasticity is 4.0 GPa. If insulation resin coating 26 has a modulus of elasticity lower than this value, it would not peel off. However, if the modulus of elasticity is higher (e.g. higher than 1.0 GPa), coefficient-of-linear-expansion adjusting material is added to insulation resin coating 26 to adjust the coefficient of linear expansion thereof, because thermal shock cycle and a big difference in coefficient of linear expansion between conductor segment 23 and insulation resin coating 26 may cause the peeling-off.

In other words, the shearing force acting between insulation resin coating 26 and the oxide film changes mainly according to the modulus of elasticity of insulation resin coating 26, the thickness thereof, and the difference in the coefficient of linear expansion between insulation resin coating 26 and copper conductor segment 23. A difference in expansion and contraction between the oxide film and insulation resin coating 26 is caused by the difference in coefficient of linear expansion between insulation resin coating 26 and copper conductor segment 23 in thermal shock cycles. If insulation resin coating 26 has a suitable modulus of elasticity sufficient to absorb the difference in the expansion and contraction, the oxide film is not broken, and, necessarily, insulation resin coating 26 does not peel off or crack. As the thickness of insulation resin coating 26 increases, insulation resin coating 26 on the oxide film becomes less flexible, resulting in that the difference caused by the expansion and contraction cannot be absorbed. Therefore, it is necessary to control the modulus of elasticity of insulation resin coating 26, the thickness thereof, and the difference in coefficient of linear expansion between insulation resin coating and copper conductor segment 23, so that the shearing force between insulation resin coating 26 and the oxide film may not exceed the strength of the oxide film.

In the above described vehicle AC generator 1, there is a distance of about 0.5 mm between adjacent conductor segments 23, which is approximately equal to the maximum thickness of insulation resin coating 26. However, the maximum thickness of insulation resin coating 26 of other rotary electric machines should be decided flexibly.

Assuming that the stator winding is heated at a temperature higher than 200° C., heat-resistant temperature of insulation resin coating 26 should be higher than 200° C. For example, if the insulation resin may be oxidized at 200° C., it is necessary to add an oxidant inhibitor.

Viscosity of insulation resin coating 26 at the initial stage and melting stage is important factor for manufacturing. That is, the distance between connection portions has been decreased to about 0.5 mm, in order to provide a compact size rotary electric machine. Therefore, the viscosity of insulation resin coating 26 before hardening should be equal to or less than 50 Pa·s. On the other hand, insulation resin coating 26 should be thicker than a certain value in order to provide effective insulation. It has been found that suitable viscosity is equal to or more than 0.1 Pa·s.

FIG. 8 is a table showing the test result of a thermal shock cycle test of various types of insulation resin coatings 26. In the thermal shock test, the test samples are exposed to ambient temperature 200° C. for one hour, and then to ambient temperature −40° C. for one hour. After this cycle is repeated 1000 times, leak current of each of the test samples is measured. If the leak current is equal to 1 mA or less, the sample is "normal". The leak current is measured while the tested sample is dipped in salt water under a 12-volt-electric field. Each of the test samples has 0.5 mm distance between connection portions and 0.5 mm maximum thickness of insulation resin coating 26.

In FIG. 8, "conventional sample 1"–"conventional sample 3" have various resin coatings instead of insulation resin coating 26. "Conventional sample 1" has flexible epoxy resin (or urethane resin) coating instead of insulation resin coating 26. Such coating has the modulus of elasticity of 1 MPa that is less than 4 GPa and suitable. However, it does not contain any oxidant inhibitor and is not resistant to high temperature (higher than 200° C.). It was found that Conventional sample 1 was carbonized to allow leak current of more than 1 A.

"Conventional sample 2" has silicone coating instead of insulation resin coating 26. Such coating has the modulus of elasticity of 10 MPa and suitable. However, it does not contain any oxidant inhibitor as the flexible epoxy resin and is not resistant to high temperature, so that it may crack and allow leak current of more than 1 A.

"Conventional sample 3" has coating formed of epoxy powder instead of insulation resin coating 26. Such coating has the modulus of elasticity of 10 GPa and is not suitable. Therefore, it may peel off or crack and allow leak current of more than 1 A.

In FIG. 8. "Embodiment 1"–"Embodiment 4" shows good test results.

In "Embodiment 1", insulation resin coating 26 is made of silicone with iron oxides (FeO, $Fe_2O_3$) as an oxidant inhibitor. Such coating has a modulus of elasticity less than 10 MPa and suitable. 3 weight-percent iron oxides can prevent the oxidation during heat-shock-cycle test. The viscosity of this embodiment 1 is 20 Pa·s, which is between 0.1 and 50 Pa·s and can get into spaces between the connection portions and stay thereon.

In "Embodiment 2", insulation resin coating 26 is made of the same silicone coating as "Embodiment 1". Such a coating contains iron oxides as an oxidant inhibitor and 10 weight-percent alumina ($Al_2O_3$) as heat-conducting filler. It has a suitable modulus of elasticity of less than 10 MPa. The viscosity thereof is about 25 Pa·s, which is between 0.1 and 50 Pa·s, so that it can get into spaces between the connection portions and stay on the surface of the connection portions.

The product name and type number of the silicone used in the above Embodiment 1 and Embodiment 2 is Toshiba Silicone's TSE326M.

In "Embodiment 3", insulation resin coating 26 is formed of epoxy powder. Such a coating contains fused silica ($SiO_2$) as a coefficient-of-linear-expansion adjusting material. It has a suitable modulus of elasticity of about 1 GPa. The added 52-weight-percent silica improves the modulus of elasticity as compared with Conventional sample 3 or others. The coefficient of linear expansion is 34 ppm, which is close to that of copper of 17 ppm. The shearing force between insulation resin coating 26 and oxide film is 0.25 MPa, which is less than its breakdown strength 1.0 MPa.

The viscosity of the insulation resin of Embodiment 3 before hardening is 10 Pa·s, which is between 0.1 and 50 Pa·s and is enough to be able to get in the spaces between the connection portions and to stay on the surface thereof.

In "Embodiment 4", insulation resin coating 26 is formed of epoxy powder as in "Embodiment 3". Such a coating contains 10 weight-percent alumina ($Al_2O_3$) as heat-conducting filler in addition to fused silica as a coefficient-of-linear-expansion adjusting material. It has a suitable modulus of elasticity of about 1 GPa. The viscosity of the insulation resin of Embodiment 4 before hardening is 12 Pa·s, which is between 0.1 and 50 Pa·s and is able to get in the spaces between the connection portions and to stay on the surface thereof.

In the above described Embodiment 3 and Embodiment 4, epoxy resin containing fused silica is used. Insulation resin coating 26 is formed, as described below, from the epoxy powder, which is applied to the connection portions of the stator winding.

Stator 2 is heated for 20 minutes at temperature of 200° C., the powder is subsequently coated on the connection portions of the stator winding in 15 minutes, and stator 2 is exposed to temperature of 220° C. for 60 minutes to be hardened.

In summary, if the maximum thickness of insulation resin coating 26 is 0.5 mm, it has to be satisfied with all the following conditions:
(1) Modulus of elasticity: 4.0 GPa or less;
(2) Heat Resistance: 200° C. or higher; and
(3) Viscosity: 0.1–50 Pa·s.

If insulation resin coating 26 is made of silicone, it is necessary to add an oxidant inhibitor, for example, iron oxides of 0.01%–5.0% thereto. On the other hand, if insulation resin coating 26 is made from epoxy powder, it is necessary to provide the coefficient of linear expansion close to that of copper, 17 ppm. For example, fused silica between 0.01%–70% has to be added thereto.

Silicone by nature is small in the modulus of elasticity. Therefore, excessive shearing force does not appear between the same and the oxide film. On the other hand, epoxy powder has considerably large modulus of elasticity necessary to be controlled by some additive.

The invention is applicable to that of a rotary electric machine other than vehicle AC generators.

If the maximum thickness is 1.5 mm, the maximum modulus of elasticity decreases to 200 MPa, and insulation resin coating 26 used in Embodiment 3 or 4 is not suitable because of unsuitable modulus of elasticity.

Conductor segment 23 can be made of aluminum instead of copper. For example, the conductors of Embodiment 1 and Embodiment 3 shown in FIG. 8 can be changed from copper to aluminum. It was found in a thermal shock test that the same insulation resin coating 26 worked well.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An insulation structure of a rotary electric machine including a stator winding having connection portions covered with insulation resin coating, wherein the modulus of elasticity of said insulation resin coating is set to be less than a maximum value which can absorb a force which acts between said insulation resin coating and said connection portions and by which said insulation resin coating is peeled off from said connection portions, and said maximum value changes according to the thickness of said insulation resin coating.

2. The insulation structure as claimed in claim 1, wherein said thickness of said insulation resin coating is 0.5 mm, and said stator winding is made of copper.

3. The insulation structure as claimed in claim 2, wherein said insulation coating is silicone containing a certain amount of oxidant inhibitor.

4. The insulation structure as claimed in claim 3, wherein the percentage content of said oxidant inhibitor is between 0.01% and 5.0%.

5. The insulation structure as claimed in claim 2, wherein said insulation coating is epoxy resin containing coefficient-of-expansion adjusting material.

6. The insulation structure as claimed in claim 4, wherein the percentage content of said coefficient-of-expansion adjusting material is between 0.01% and 70%.

7. A stator of a vehicle AC generator comprising:

a stator core having a plurality of slots, a stator winding having a plurality of conductor segments which are disposed in said plurality of slots and are connected with one another at ends thereof to form connection portions, and, insulation resin coating covering said connection portions, said insulation resin coating being formed on an oxide film formed on the surface of said connection portions, wherein modulus of elasticity, thickness and coefficient of linear expansion of said insulation resin coating are set so that the shearing force acting between said insulation resin coating and said oxide film becomes less than a strength of said oxide film.

8. The stator of a vehicle AC generator as claimed in claim 7, wherein said oxide film is formed when said copper conductor segments are heated and welded.

9. The stator as claimed in claim 7, wherein said modulus of elasticity, thickness, and coefficient of linear expansion are set so that a shearing force acting between said insulation resin coating and said oxide film becomes equal to or less than 1.0 MPa.

10. The stator as claimed in claim 7, wherein the heat resistant temperature of said insulation resin coating is equal to or more than 200° C.

11. The stator as claimed in claim 7, wherein the coefficient of viscosity of said insulation resin coating is between 0.1–50 Pa·s.

12. The stator as claimed in claim 7, wherein each of said copper conductor segments is covered with insulation resin coating except said connection portions from which said insulation resin coating is peeled off, and said insulation resin coating covers not only said connection portions but also insulation films which are deteriorated when end portions of said conductor segments are heated.

* * * * *